United States Patent [19]

Nomura

[11] Patent Number: 4,910,544
[45] Date of Patent: Mar. 20, 1990

[54] FOCUS ADJUSTING APPARATUS IN ZOOM LENS CAMERA

[75] Inventor: Hiroshi Nomura, Tokyo, Japan

[73] Assignee: Asahi Kogaku Kogyo K.K., Tokyo, Japan

[21] Appl. No.: 310,191

[22] Filed: Feb. 14, 1989

[30] Foreign Application Priority Data

Feb. 15, 1988 [JP] Japan ............................ 63-18457[U]
Feb. 15, 1988 [JP] Japan ............................ 63-18458[U]
Feb. 15, 1988 [JP] Japan ............................ 63-32544

[51] Int. Cl.$^4$ ............................................. G03B 1/18
[52] U.S. Cl. ................................ 354/195.12; 350/252; 350/255
[58] Field of Search ............ 354/195.1, 195.11, 195.12; 350/252, 253, 255, 429, 430

[56] References Cited

U.S. PATENT DOCUMENTS 4,387,968 6/1983 Sekiguchi ............................ 350/429
4,533,218 8/1985 Nakazato et al. ............... 350/255 X

FOREIGN PATENT DOCUMENTS 59-32971 9/1984 Japan .
62-123612 8/1987 Japan .
63-80534 5/1988 Japan .
63-193114 8/1988 Japan .

Primary Examiner—L. T. Hix
Assistant Examiner—Brian W. Brown
Attorney, Agent, or Firm—Sandler & Greenblum

[57] ABSTRACT

A focus adjusting apparatus including an immovable cylinder secured to a camera body, a cam ring which is associated with the immovable cylinder to rotate and move in the optical axis directions and which is provided on its outer periphery with a circumferential groove or projection, a thrust member having a projection or groove which is engaged by the groove or the projection of the cam ring. The thrust member is capable of moving together with the cam ring in the optical axis direction and rotating relative to the cam ring. The apparatus also includes an adjustment fixing device for moving the thrust member in the optical axis directions to fix the thrust member to the immovable cylinder at a desired position.

28 Claims, 10 Drawing Sheets

FOCUS ADJUSTING APPARATUS IN ZOOM LENS CAMERA

BACKGROUND OF THE INVENTION

1. Field of the Invention

The present invention relates to a zoom lens camera having at least two front and rear groups of lenses and more particularly it relates to an apparatus for focus adjustment called a back adjustment (back focusing).

2. Description of Related Art

A zoom lens camera has at least two groups of lenses, i.e., a front group of lenses and a rear group of lenses, so that the groups of lenses are moved together or separately to control the spatial distance therebtween to allow zooming. Generally, a cam ring is used to control the position of the groups of lenses, so that when the cam ring is rotated, the lenses are moved to control the spatial distance therebetween.

In a conventional zoom lens camera, it is necessary to provide zooming adjustment for minimizing the displacement of the focal point at a desired focal length and a back adjustment for making the focal point coincide with the position of the film after the zooming adjustment is completed.

This zooming adjustment is usually effected by adjusting a relative position of a lens ring which supports the groups of lenses on a cam ring follower. The lens ring is screw-engaged by the cam ring follower which is moved in accordance with the rotation of the cam ring and accordingly the zooming adjustment can be effected by the adjustment of an axial position of the cam ring.

However, since the back adjustment is an adjustment of the axial position of the whole of the groups of lenses after the zooming adjustment is completed to focus an image precisely onto a film plane, it is necessary to adjust the axial position of the cam ring. Therefore, in a conventional camera, an immovable cylinder (lens unit) which rotatably supports the cam ring while preventing the axial displacement thereof is secured to a camera body through a washer which is inserted between the camera body and the immovable cylinder in accordance with a premeasured distance between a reference surface of the lens unit which comes into contact with a reference surface of the camera body and a focal point, so that the focal point meets the film plane.

However, in the back adjustment mechanism as mentioned above, it is not only necessary to determine the measurement of the focal point for each lens unit upon assembly of the camera, but also to prepare many kinds of washers corresponding to the measurements, resulting in difficulty in diassembly. Furthermore, if the dimensional precision of washers or the associated elements is out of allowable limits, it is impossible to perform the back adjustment by using the washers. In order to make a readjustment, it is necessary to disassemble and reassemble substantial parts of the camera because of the inside location of the washer(s), resulting in inefficiency.

SUMMARY OF THE INVENTION

The primary object of the present invention is to provide a focus adjusting apparatus in which the back adjustment of the zoom lens can be easily effected.

Another object of the present invention is to provide an apparatus which can easily perform the back adjustment even after assembly.

Another object of the present invention is to provide a focus adjusting apparatus in which a displacement of the cam ring within the immovable cylinder can be prevented and no fluctuation (displacement) of the focal point takes place in use and upon back adjustment, regardless of the position of the camera.

Still another object of the present invention is to provide a focus adjusting apparatus which can prevent the cam ring from deviating or inclining from the optical axis of the camera in the course of the back adjustment.

To achieve the objects mentioned above, a focus adjusting apparatus is provided having a zoom lens barrel with at least two front and rear groups of lenses and a cam ring which moves in the optical axis direction to restrict the axial position of all of the groups of lenses and which rotates to restrict the relative position of the groups of lenses, wherein the apparatus comprises an immovable cylinder secured to a camera body, the cam ring being associated with the immovable cylinder to rotate and move in the optical axis directions, the cam ring being provided on its outer periphery with a circumferential engaging member, at least one thrust member having a mating engaging member which is engaged by the engaging member, the thrust member being capable of moving together with the cam ring in the optical axis directions and rotating relative to the cam ring, and an adjustment fixing means for moving the thrust member in the optical axis directions to fix the thrust member to the immovable cylinder at a desired position.

With this arrangement, the back adjustment can be effected by the adjustment of the thrust member.

Preferably, an adjusting hole for the adjustment fixing means is provided on a camera body case to make a readjustment possible without disassembly.

According to another aspect of the present invention, the cam ring can incline only in one direction to prevent the displacement or deviation of the focal point due to a difference in position of the camera in use or during the back adjustment. A pair of thrust members can be provided on the radial opposite sides of the cam ring, so that one of the thrust members is used for the back adjustment and the other thrust member for the restriction of the inclination of the cam ring into only one optical axis direction. The other thrust member is biased in one optical axis direction, so that the cam ring can be inclined only in one predetermined direction, thus resulting in the prevention of deviation or displacement of the focal point due to a change of position of the camera.

According to still another aspect of the present invention, the improvement is directed to preventing the cam ring from being inclined while allowing easy back adjustment. Thus, the cam ring does not directly fit into the immovable cylinder but is rotatably supported by a thrust hold ring so as not to move in the optical axis directions, so that the thrust hold ring fits onto the immovable cylinder and move in the optical axis directions. The adjustment fixing means in the optical axis directions corresponds to the thrust hold ring.

The thrust hold ring which is made of, for example, synthetic resin elastically fits onto the immovable cylinder, so that no inclination thereof with respect to the immovable cylinder takes place. It is also possible to support the cam ring on the thrust hold ring without an inclination. Accordingly, in the back adjustment in which the thrust hold ring is moved in the optical axis directions, no inclination of the thrust hold ring takes place, and therefore no inclination of the cam ring which is supported by the thrust hold ring takes place.

BRIEF DESCRIPTION OF DRAWINGS

The invention will be described below in detail with reference to the accompanying drawings, in which.

DETAILED DESCRIPTION OF EMBODIMENTS

Figure 1A:
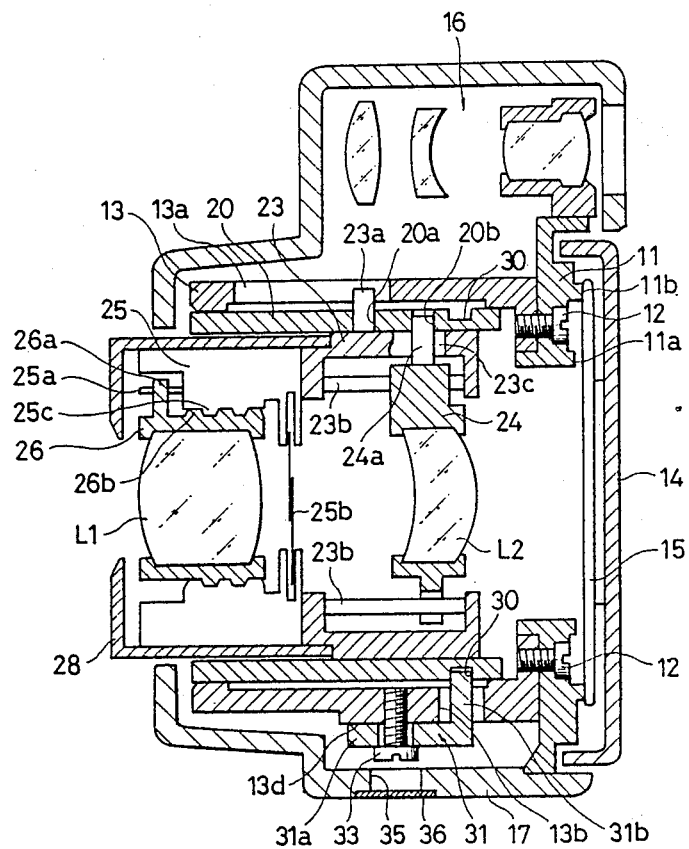
FIG. 1A is a longitudinal sectional view of a focus adjusting apparatus according to a first embodiment of the present invention.
Figure 1B:
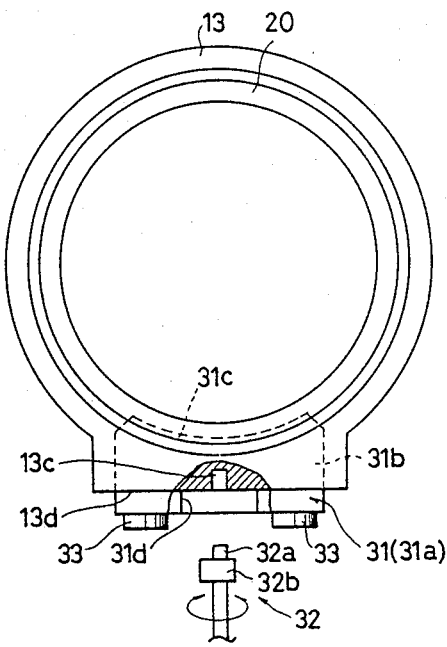
FIG. 1B is a partial front elevational view of FIG. 1A.
Figure 1C:
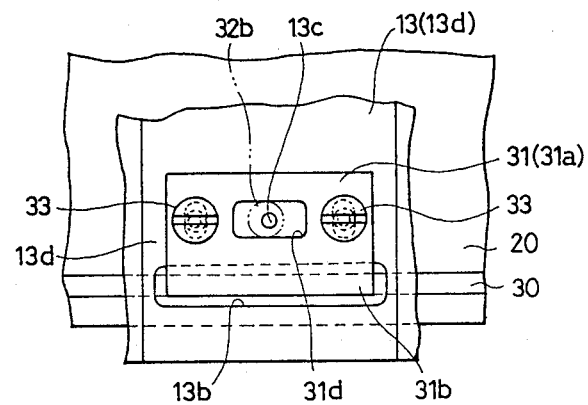
FIG. 1C is a bottom view of FIG. 1B.

FIGS. 1A through 1C show a first embodiment of the present invention, in which a camera body 11 is provided on its front face with an immovable or stationary cylinder 13 secured thereto by set screws 12. An inner rail 11a and an outer rail 11b are provided on the rear face of the body 11. A pressure plate 15 on the back cover 14 bears against the outer rail 11b, so that film moves in a space defined between the pressure plate 15 and the inner rail 11a.

A finder optical system 16 is provided above the body 11. The body 11, the finder optical system 16 and the immovable cylinder 13 are covered by a camera body case 17.

A cam ring 20 is fitted to the inner periphery of the immovable cylinder so as to rotate and move in the optical axis directions. One of the significant features of the present invention is the capability of moving the cam ring 20 in the optical axis directions in addition to the capability of rotating. The cam ring 20 has cam grooves 20a and 20b for moving a front group of lenses, which will be referred to as a front lens group L1, and a rear group of lenses which will be referred to as a rear lens group L2, in the optical axis directions along predetermined tracks, respectively. A pin 23a which is provided in a cam follower (ring) 23 for the front lens group fits in the cam groove 20a. The pin 23a also fits in a linear movement guide groove 13a extending in the optical axis direction formed in the immovable cylinder 13, so that the cam follower 23 can be moved only in the optical axis directions without rotating.

The cam follower 23 has a guide pin 23b which extends in parallel with the optical axis and which movably supports a cam follower (ring) 24 of the rear lens group, to which the rear lens group L2 is secured. The cam follower 24 has a pin 24a which fits in the cam groove 20b of the cam ring 20 through a through hole (groove) 23c formed in the cam follower 23 for the front lens group.

A lens shutter unit 25 is secured to the front end of the cam follower 23 for the front lens group. The lens shutter unit 25 is screw-engaged by a front lens group ring 26 having the front lens group L1 secured thereto through helicoids 25c and 26b. As is well known, the lens shutter unit 25, on one hand, rotates a drive pin 25a about the optical axis by an angle corresponding to an object distance which is measured by an object distance measuring device (not shown), and on the other hand, opens and closes a shutter sector 25b in accordance with a measuring light signal which is an output from a photometer (light measuring device). The drive pin 25a is engaged by an association arm 26a secured to the front lens group ring 26. In the darwings, although the association arm 26a is illustrated to be integral with the front lens group ring 26, the association arm 26a is secured to the front lens group ring 26 after the axial position of the front lens group ring 26 (front lens group L1) is determined by the zooming adjustment. Thus, the front lens group ring 26 moves in the optical axis directions in accordance with the rotational angle of the drive pin 25a to adjust the focus. Numeral 28 designates a lens unit cover secured to the outer periphery of the lens shutter unit 25.

The cam ring 20 is rotated by a drive motor through a gear train (both not shown). When the cam ring 20 rotates, the cam follower 23 for the front lens group, and accordingly the front lens group L1 are moved in the optical axis directions in accordance with the cam groove 20a and the linear movement guide groove 13a, so that the cam follower 24 for the rear lens group, and accordingly the rear lens group L2 are moved in the optical axis directions in accordance with the cam groove 20b, while maintaining a spatial distance between the front and rear lens group L1 and L2 at a preset value to thereby complete the zooming operation.

According to the present invention, a back adjustment mechanism is provided between the cam ring 20 and the immovable cylinder 13.

The cam ring 20 is provided on its outer periphery with a circumferential groove 30 which lies in a plane perpendicular to the optical axis. A thrust member 31 is supported on the lower portion of the immovable cylinder 13. The thrust member 31 has a planar portion 31a lying along a planar portion 13d formed on the outer surface of the immovable cylinder 13, and an association portion 31b which is connected to the rear end of the planar portion 31a. The association portion 31b extends inward through a larger hole 13b formed in the immovable cylinder 13 to allow play. The thrust member is generally L-shaped in section. The association portion 31b is provided on its inner end with an curved portion 31c which fits in the circumferential groove 30.

The planar portion 31a has an elongated rectangular adjusting hole 31d extending in a direction perpendicular to the optical axis, as shown in FIG. 1C. The planar portion 13d has a central adjusting hole 13c which corresponds to the adjusting hole 31d and in which a head 32a of an eccentric pin jig 32 can fit.

The eccentric pin jig 32 has an eccentric ring portion 32b which is eccentric to the head 32a and which snugly fits in the adjusting hole 31d. Numeral 33 designates set screws for securing the thrust member 31 to the immovable cylinder 13.

The camera body case 17 has an adjusting hole 35 corresponding to the central adjusting hole 13c and the set screws 33. The adjusting hole 35 is closed by a detachable closure (closing member) 36.

Upon the zooming adjustment to the production of the zoom lens camera as mentioned above, the front lens group ring 26 is rotated relative to the lens shutter unit 25 to adjust the distance between the front lens group L1 and the rear lens group L2 in order to bring the focal point to one allowable point on the optical axis, regardless of the change of the focal length. After the zooming adjustment is completed, the association arm 26a is secured to the front lens group ring 26.

When the zooming adjustment is completed, the back focusing (back adjustment) is effected while looking at the focal point. The back adjustment can be very easily performed according to the present invention. The eccentric ring portion 32b of the eccentric pin jig 32 fits in the adjusting hole 31d of the thrust member 31, and the head 32a of the jig 32 fits in the central adjusting hole 13c of the immovable cylinder 13. The set screws 33 are loosened in advance. In this state, when the eccentric pin jig 32 is rotated, the thrust member 31 moves in the optical axis direction since the head 32a thereof (the central eccentric adjusting hole 13c) and the eccentric ring portion 32b are eccentric to each other. As a result, since the inner curved portion 31c of the thrust member 31 is engaged by the circumferential groove 30 of the cam ring 20, the cam ring 20 also moves in the optical axis direction. Accordingly, it is possible to restrict the axial position of the cam ring 20 in a position in which the back adjustment is completed by fastening the set screws 33 to secure the thrust member 31 to the immovable cylinder 13 when the focal point is made coincidental with the location of the inner rail 11a. It can be seen that the axial position of the cam ring 20 is restricted by the engagement of the circumferential groove 30 and the thrust member 31 but the cam ring is free to rotate. Therefore zooming can take place.

Alternatively, the circumferential groove 30 of the cam ring 20 can be replaced with a circumferential projection. In this alternative, the thrust member 31 is provided with a groove in which the circumferential projection can be engaged. Any thrust member can be used, as long as it moves in the optical axis direction together with the cam ring 20 while permitting the cam ring to rotate.

When the back adjustment is effected again after the assembly of the camera, the closure 36 is opened from the adjusting hole 35, and then the set screws 33 are loosened, so that the above-mentioned operations can be repeated to carry out the back adjustment. Accordingly, no disassembly is necessary, thus resulting in an easy readjustment.

Note that in the prior art, the back adjustment is performed by adjusting the thickness of an insert which is inserted between the immovable cylinder 13 and the body 11. Namely, washers 50 having different thicknesses are selectively inserted between the immovable cylinder 13 and the body 11 in accordance with the detected focal point after the zooming adjustment, as shown in FIG. 5.

Figure 5:
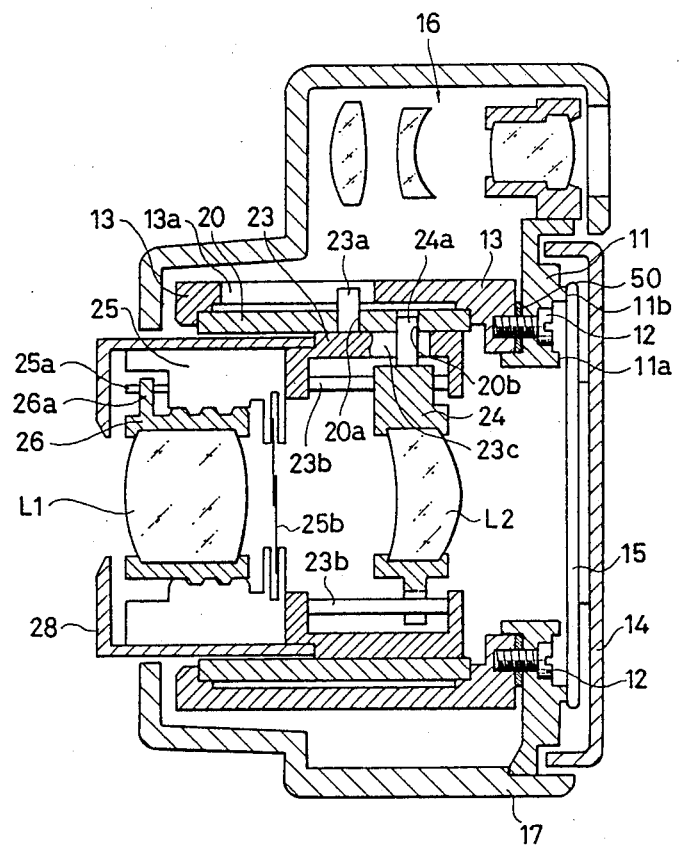
FIG. 5 is a sectional view corresponding to FIGS. 1A, 2A, 3A and 4A showing a back adjustment mechanism of a known focus adjusting apparatus.

In the arrangement shown in FIG. 5, the cam ring 20 is rotatably supported by the immovable cylinder 13 so as not to move in the optical axis directions, in comparison with the arrangement shown in FIG. 1A. Furthermore, in FIG. 5, the circumferential groove 30, the thrust member 31, the eccentric pin jig 32, the set screws 33, the adjusting hole 35 and the closure 36 shown in FIG. 1A are all not provided. In FIG. 5, elements corresponding to those in FIG. 1A are designated with the same numerals. The advantage of the present invention will be easily understood when FIGS. 1A and 5 are compared.

FIGS. 2A through 2D show a second embodiment of the present invention.

In the second embodiment, an additional thrust member 40 is provided on the upper portion of the immovable cylinder 13. The thrust member 40 is generally similar to the thrust member 30 in shape. The thrust member 40 which is generally of L-shaped in section has a planar portion 40a which lies along the planar portion 13e formed on the outer upper surface of the immovable cylinder 13, and an association portion 40b which is connected to the rear end of the planar portion 40a and which inwardly extends larger through a through hole 13f of the immovable cylinder 13 to allow play. The association portion 40b has at its inner end an curved portion 40c which fits in the circumferential groove 31.

The upper thrust member 40 has a pin 40d provided on the upper surface of the end of the planar portion 40a that is far away from the association portion 40b, so that a tensile spring 42 is provided between the pin 40d and another pin 41 which is provided on the immovable cylinder 13. The displacement of the thrust member 40 is determined by guide pins 44 provided on the immovable cylinder 13 and a guide hole 45 formed in the thrust member 40.

The other elements of the second embodiment are similar to the first embodiment.

In the second embodiment illustrated in FIGS. 2A through 2D, components corresponding to those in the first embodiment shown in FIGS. 1A through 1C are designated with the same numerals.

In the second embodiment, the back adjustment can be performed in the same way as the first embodiment mentioned above. Furthermore, the axial movement of the cam ring 20 is restricted by the thrust members 30 and 40, and the upper thrust member 40 is biased rearward by the tensile spring 42. Namely, the upper thrust member 40 tends to continuously incline the cam ring 20 in a predetermined direction in the immovable cylinder 13. The amount of inclination is very small due to a slight clearance between the immovable cylinder 13 and the cam ring 20. If the clearance is large, there is a possibility that the cam ring 20 inclines in all directions depending on the posture thereof in the immovable cylinder 13 during the back adjustment or in use. The inclination causes the displacement of the focal point, thus resulting in an error of the zoom lens and has an adverse influence on pictures.

Figure 2A:
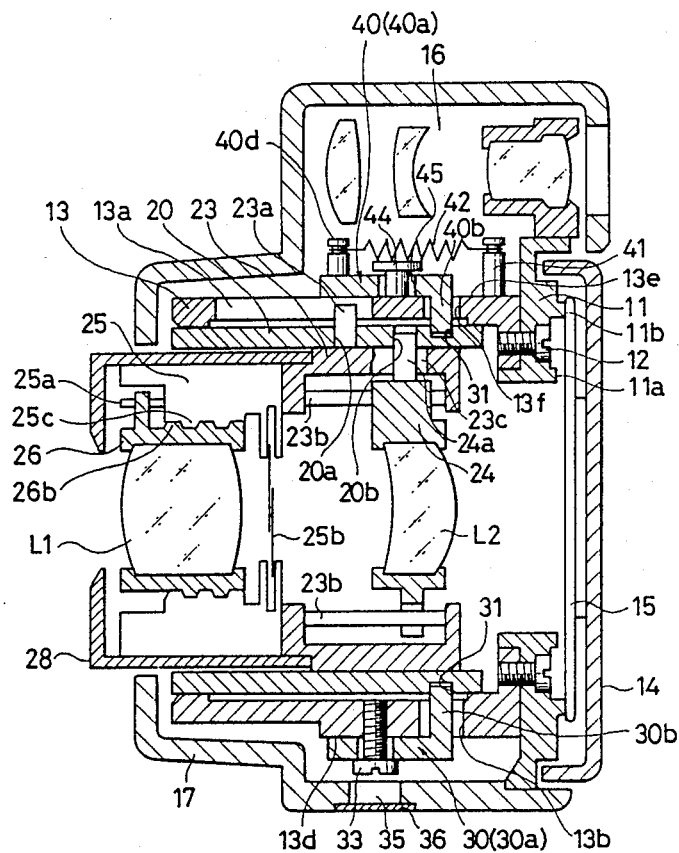
FIG. 2A is a longitudinal sectional view of a focus adjusting apparatus according to a second embodiment of the present invention.
Figure 2B:
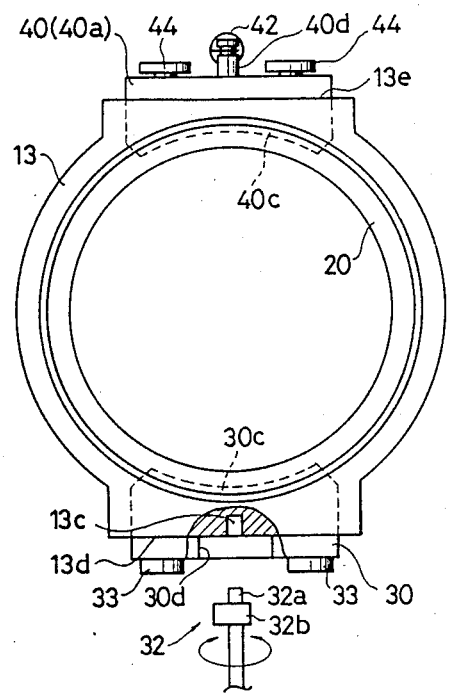
FIG. 2B is a partial front elevational view of FIG. 2A.
Figure 2C:
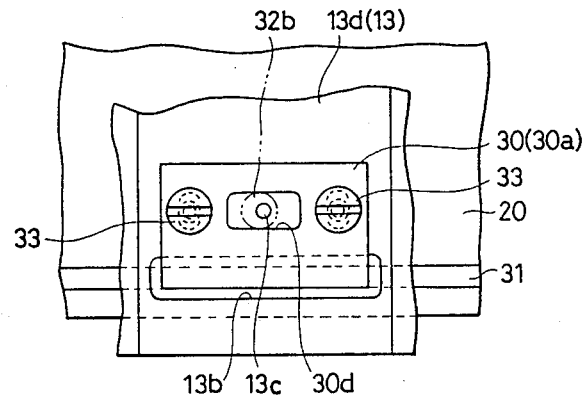
FIG. 2C is a bottom view of FIG. 2B.
Figure 2D:
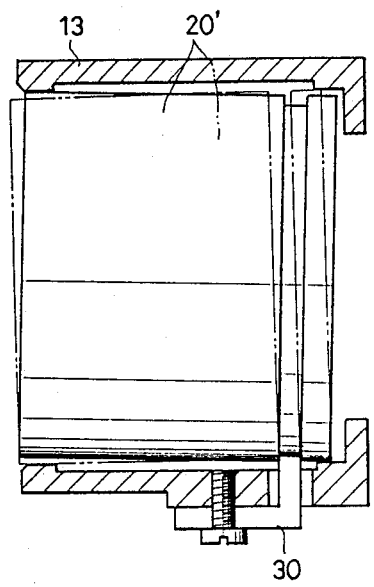
FIG. 2D is a sectional view showing a problem which is raised when only one thrust member is provided.

The clearance between the immovable cylinder 13 and the cam ring 20 is exaggerated in FIG. 2D, in which the inclined cam ring 20' is designated by the solid line and dotted line.

When the cam ring 20 is intentionally inclined in one predetermined direction by the thrust member 40, as seen in the second embodiment, even if an inclination of a picture image takes place, no displacement of the focal point due to the change of posture occurs. It is not difficult to adjust the focal length or the F-number so as to prevent the inclination from having an adverse influence on a picture taken by the camera. Thus, a zoom lens having no error can be obtained.

The supporting mechanism of the upper thrust member 40 can be same as that of the lower thrust member 30. However, in such a case, there are two adjusting portions, resulting in difficulty in adjustment. Accordingly, it is advisable and preferable to provide a biasing spring which biases the upper thrust member in order to make the readjustment possible without disassembly.

Figure 3A:
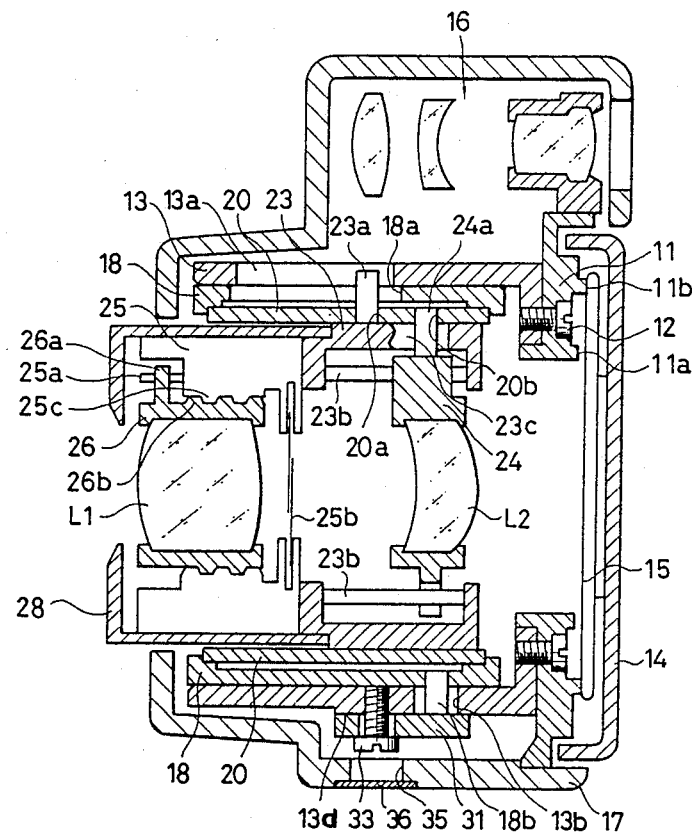
FIG. 3A is a longitudinal sectional view of a focus adjusting apparatus according to a third embodiment of the present invention.
Figure 3B:
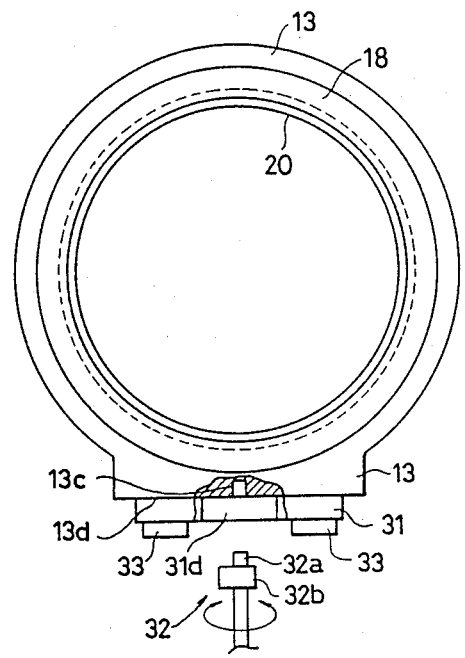
FIG. 3B is a partial front elevational view of FIG. 3A.
Figure 3C:
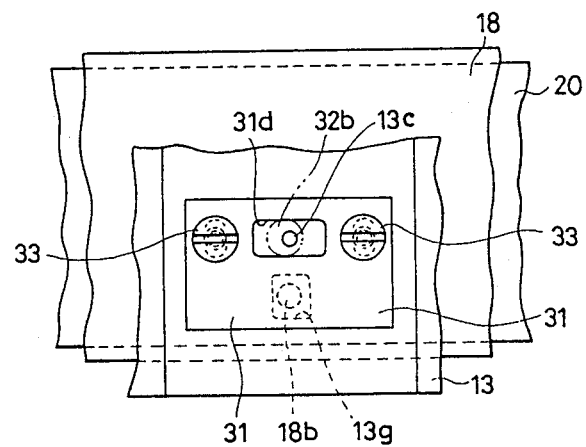
FIG. 3C is a bottom view of FIG. 3B.

FIGS. 3A through 3C show a third embodiment of the present invention, in which a thrust hold ring 18 is provided between the immovable cylinder 13 and the cam ring 20, so that the thrust hold ring 18 is moved in the optical axis directions through thrust member 31 to effect the back adjustment.

The thrust hold ring 18 fits in the inner periphery of the immovable cylinder 13, and the cam ring 20 fits in the inner periphery of the thrust hold ring 18. The fit tolerance between the thrust hold ring 18 and the immovable cylinder 13 is very strict, so that no inclination of the thrust hold ring 18 relative to the immovable cylinder 13 takes place. Such a strict tolerance can be achieved by decreasing the clearance between the thrust hold ring 18 and the immovable cylinder 13 or by an elastic fit in which the thrust hold ring 18 is elastically and slightly deformable to reduce the diameter thereof upon fitting. The elastic fit can be obtained by making the thrust hold ring 18, for example, of synthetic resin.

The cam ring 20 is supported by the thrust hold ring 18 so as to rotate without moving in the axial directions relative thereto. The clearance between the thrust hold ring 18 and the cam ring 20 is as small as possible within a limit in which the relative rotation smoothly takes place.

The thrust hold ring 18 has a linear movement guide groove 18a in which the pin 23a provided on the cam follower 23 for the front lens group fits.

Between the thrust hold member 18 and the immovable cylinder 13 is provided a back adjustment mechanism in which a back adjustment member 31 lying along the planar portion 13b formed on the lower outer surface of the immovable cylinder 13 is integrally connected to the thrust hold ring 18 through an association pin 18b, so that the back adjustment member 31 can be moved in directions parallel with the optical axis. The back adjustment mechanism also includes an adjustment fixing means for fixing the back adjustment member 31 in a desired axial position.

The associaton pin 18b extends through and is movable backward and forward through a hole 13g of the immovable cylinder 13, therefore allowing play. The back adjustment member 31 has an elongated rectangular adjusting hole 31d extending in a direction perpendicular to the optical axis. The planar portion 13b has a central adjusting hole 13c corresponding to the adjusting hole 31d. The head 32a of the eccentric pin jig 32 fits in the central adjusting hole 13c. The eccentric pin jig 32 has an eccentric ring portion 32b eccentric to the head 32a, so that the eccentric ring portion 32b snugly fits in the adjusting hole 31c without play. Numeral 33 designates set screws for securing the back adjustment member 31 to the immovable cylinder 13.

In the third embodiment, the back adjustment can be carried out in the way similar to that of the second embodiment. Furthermore, since the thrust hold ring 18 is connected to the immovable cylinder for example through an elastic fit so that no inclination of the thrust hold ring takes place with respect to the immovable cylinder 13, the thrust hold ring 18 and accordingly the cam ring 20 held by the thrust hold ring are not inclined upon back adjustment.

Figure 4A:
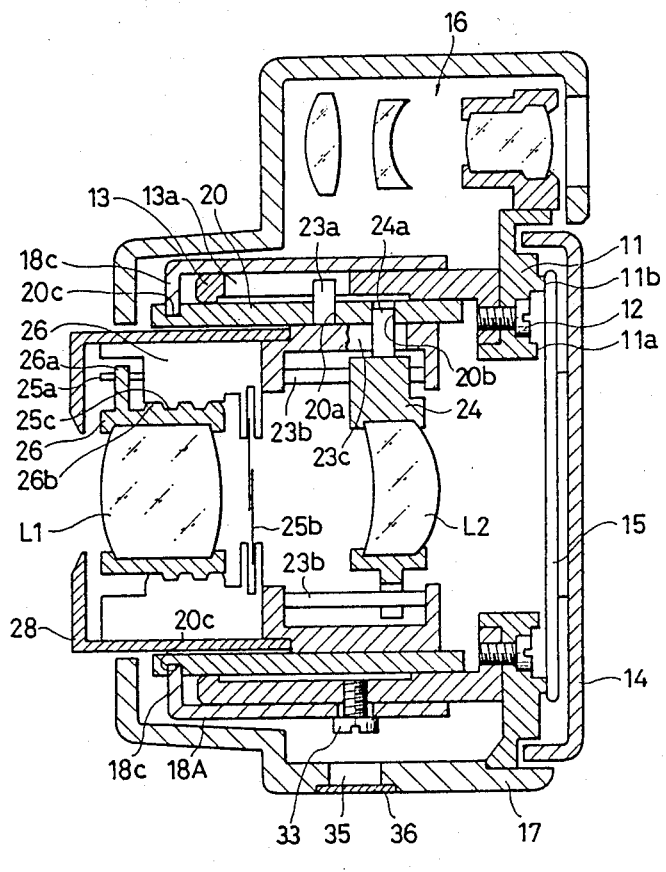
FIG. 4A is a longitudinal sectional view of a focus adjusting apparatus according to a fourth embodiment of the present invention.
Figure 4B:
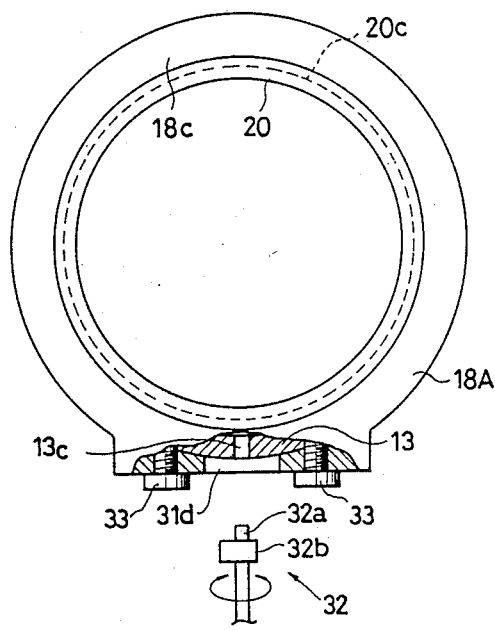
FIG. 4B is a partial front elevational view of FIG. 4A.
Figure 4C:
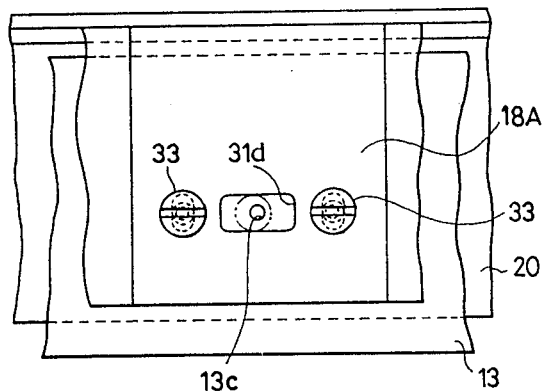
FIG. 4C is a bottom view of FIG. 4B.

FIGS. 4A through 4C show a fourth embodiment of the present invention, in which the thrust hold ring 18A fits onto the outer periphery of the immovable cylinder 13. The thrust hold ring 18A has at its front end an inner flange 18c. The inner flange 18c snugly fits in the circumferential groove 20c formed on the outer periphery of the cam ring 20 without play, so that the thrust hold ring 18A and the cam ring 20 are equally moved in the optical axis directions. The fit between the thrust hold ring 18A and the immovable cylinder 13 is, for example, an elastic fit similar to the connection between the thrust hold ring 18 and the immovable cylinder 13 in the third embodiment mentioned before, so that the thrust hold ring 18A is elastically deformed to increase the diameter thereof upon fitting. The cam ring 20 rotatably fits in the inner periphery of the immovable cylinder 13.

The elongated adjusting hole 31d extending in a direction perpendicular to the optical axis is formed in the thrust hold ring 18A, so that the set screws 33 are used to secure the thrust hold ring 18A to the immovable cylinder 13. The other construction of the fourth embodiment is similar to that of the first embodiment. In FIGS. 4A through 4C, elements corresponding to those in the first embodiment are designated with the same numerals as those in the first embodiment.

In the fourth embodiment, the thrust hold ring 18A is moved in the optical axis directions directly by the eccentric pin jig 32 to carry out the back adjustment.

In theory, the inner circumferential flange 18c can be circumferentially discontinuous. More specifically the flange 18c can be formed by, for example, three divided flange portions which are movable together with the cam ring 20 in the optical axis directions and which are free to rotate relative to the cam ring 20. If a peripheral groove is formed in the immovable cylinder 13, it is possible to provide the inner flange portion or portions on the intermediate portion of the thrust hold ring 18A, so that the inner flange portion or portions extends or extend through the peripheral groove.

As can be understood from the above discussion, according to the present invention, the back adjustment of the zoom lens can be easily performed only by the adjustment of the axial position of the thrust member(s). More specifically, the axial position of the thrust member can be adjusted, while actually seeing the focal point, and accordingly the back adjustment is simpler and more precise than the conventional adjustment in which the thickness of the washer is determined in accordance with the measurement of the focal point which is detected for each lens unit. Furthermore, the adjusting hole which is closed by the closure and which is formed on the camera body case contributes to an easy readjustment after assembly without disassembly.

In particular, when a pair of thrust members are provided on the opposite sides of the cam ring, and one of the thrust members being biased in one optical axis direction, it is possible to prevent the cam ring from being displaced in the immovable cylinder, so that there is no possibility that the focal point is displaced due to the change of position upon the back adjustment or in use, thus resulting in clear pictures taken by the camera.

Furthermore, when the cam ring is held by the thrust hold ring, it is necessary for the thrust hold ring only to move in the optical axis directions relative to the immovable cylinder only at the back adjustment. This makes it possible to realize a fit between the thrust hold ring and the immovable cylinder so that no inclination of the thrust hold ring relative to the immovable cylinder occurs, resulting in no inclination of the cam ring.

What is claimed is:

1. In a zoom lens barrel of a zoom lens camera having at least two front and rear groups of lenses and a cam ring which moves in the optical axis directions to restrict the axial position of the groups of lenses and which rotates to restrict the relative position of the groups of lenses, the improvement comprising a focus adjusting apparatus which comprises an immovable cylinder secured to a camera body, said cam ring being associated with the immovable cylinder to rotate and move in the optical axis directions, said cam ring being provided on its outer periphery with a circumferential engaging member, at least one thrust member having a mating engaging member which is engaged by the circumferential engaging member, said thrust member being capable of moving with the cam ring in the optical axis directions and rotating relative to the cam ring, and an adjustment fixing means for moving the thrust member in the optical axis directions to fix the thrust member to the immovable cylinder at a desired position.

2. A focus adjusting apparatus according to claim 1, wherein said circumferential engaging member of the cam ring is a projection.

3. A focus adjusting apparatus according to claim 1, wherein said circumferential engaging member of the cam ring is a groove.

4. A focus adjusting apparatus according to claim 2, wherein said mating engaging member of the thrust member is a groove.

5. A focus adjusting apparatus according to claim 3, wherein said mating engaging member of the thrust member is a projection.

6. A focus adjusting apparatus according to claim 1, further comprising a camera body case which houses the immovable cylinder and the cam ring and which has an adjusting hole through which the adjustment fixing means can be operated.

7. A focus adjusting apparatus according to claim 6, further comprising a closing member which closes the adjusting hole of the camera body case.

8. A focus adjusting apparatus according to claim 6, wherein said adjusting hole is provided on the lower surface of the camera body case.

9. A focus adjusting apparatus according to claim 6, wherein said thrust member has a planar portion along a lower surface of the immovable cylinder and an association portion which extends inward from the rear end of the planar portion, so that the thrust member is generaly of L-shape.

10. A focus adjusting apparatus according to claim 9, wherein said immovable cylinder has a through hole through which the association portion of the thrust member extends.

11. A focus adjusting apparatus according to claim 10, wherein said circumferential engaging member of the cam ring is a groove and wherein said association portion of the thrust member is provided on its front end with a curved portion which is connected to the circumferential groove of the cam ring.

12. A focus adjusting apparatus according to claim 11, wherein said planar potion of the thrust member has an elongated rectangular adjusting hole extending in a direction perpendicular to the optical axis.

13. A focus adjusting apparatus according to claim 12, wherein said immovable cylinder is provided on its lower surface with a central adjusting hole corresponding to the adjusting hole of the thrust member.

14. A focus adjusting apparatus according to claim 1, wherein said cam ring has cam grooves which determine the axial positions of the front and rear groups of lenses.

15. A focus adjusting apparatus according to claim 1, further comprising two thrust members which are located on the radial opposite sides of the cam ring.

16. In a zoom lens barrel of a zoom lens camera having at least two front and rear groups of lenses and a cam ring which moves in the optical axis directions to restrict the axial position of the groups of lenses and which rotates to restrict the relative position of the groups of lenses, the improvement comprising a focus adjusting apparatus which comprises an immovable cylinder secured to a camera body, said cam ring being associated with the immovable cylinder to rotate and move in the optical axis directions, said cam ring being provided on its outer periphery with a circumferential engaging member, a pair of thrust members which are located on the opposite sides of the cam ring, said thrust members being capable of moving together with the cam ring in the optical axis directions and rotating relative to the cam ring, an adjustment fixing means for moving one of the thrust members in the optical axis directions to fix the same to the immovable cylinder at a desired position, and biasing means for biasing the other thrust member in one optical axis direction.

17. A focus adjusting apparatus according to claim 16, wherein said one thrust member which is moved in the optical axis directions is located on the lower side of the cam ring and said the other thrust member which is biased in one optical axis direction is located on the upper side of the cam ring.

18. A focus adjusting apparatus according to claim 16, wherein said biasing means comprises a pin provided on the associated thrust member, a pin provided on the immovable cylinder, and a tensile spring provided between the pins.

19. A focus adjusting apparatus according to claim 18, wherein said tensile spring biases the associated thrust member rearward.

20. In a zoom lens barrel of a zoom lens camera having at least two front and rear groups of lenses and a cam ring which moves in the optical axis direction to restrict the axial position of the groups of lenses and which rotates to restrict the relative position of the groups of lenses, the improvement comprising a focus adjusting apparatus which comprises an immovable cylinder secured to a camera body, a thrust hold ring which is axially movably associated with the immovable cylinder, said cam ring being rotatably held by the thrust hold ring so as not to axially move, and an adjustment fixing means for moving the thrust hold ring in the optical axis directions to fix the same to the immovable cylinder at a desired position.

21. A focus adjusting apparatus according to claim 20, wherein said thrust hold ring is elastically associated with said immovable cylinder.

22. A focus adjusting apparatus according to claim 20, wherein said thrust hold ring is made of synthetic resin.

23. A focus adjusting apparatus according to claim 20, wherein said thrust hold ring is elastically associated with the inner periphery of the immovable cylinder.

24. A focus adjusting apparatus according to claim 23, wherein said cam ring is associated with the inner periphery of the thrust hold ring.

25. A focus adjusting apparatus according to claim 23, wherein said thrust hold ring is associated with the outer periphery of the immovable cylinder, said thrust hold ring being provided with an inner flange which is engaged by the cam ring so as to move together with the can ring in the optical axis directions and to rotate relative to the cam ring, said cam ring being associated with the inner periphery of the immovable cylinder.

26. A focus adjusting apparatus according to claim 25, wherein said camera includes a camera body case in which the immovable cylinder, the cam ring, and the thrust hold ring are accommodated.

27. A focus adjusting apparatus according to claim 26, wherein said camera body case includes an adjusting hole for the adjustment fixing means.

28. A focus adjusting apparatus according to claim 27, further comprising a closing member which normally closes the adjusting hole of the camera body case.

* * * * *